(12) United States Patent
Wartena et al.

(10) Patent No.: US 9,555,889 B2
(45) Date of Patent: Jan. 31, 2017

(54) CREW REST AREA ON BOARD OF A VEHICLE, IN PARTICULAR AN AIRPLANE

(71) Applicant: Zodiac Aircatering Equipment Europe B.V., Alkmaar (NL)

(72) Inventors: Jochem Floris Wartena, Utrecht (NL); Tom Schreuder, Wassenaar (NL)

(73) Assignee: Zodiac Aircatering Equipment Europe B.V., Alkmaar (NL)

(*) Notice: Subject to any disclaimer, the term of this patent is extended or adjusted under 35 U.S.C. 154(b) by 44 days.

(21) Appl. No.: 14/462,997

(22) Filed: Aug. 19, 2014

(65) Prior Publication Data
US 2015/0053817 A1    Feb. 26, 2015

(30) Foreign Application Priority Data
Aug. 20, 2013    (NL) ..................... 2011318

(51) Int. Cl.
| | | |
|---|---|---|
| *B64D 11/06* | (2006.01) | |
| *B64D 11/00* | (2006.01) | |
| *B64D 11/04* | (2006.01) | |

(52) U.S. Cl.
CPC ............ *B64D 11/00* (2013.01); *B64D 11/04* (2013.01); *B64D 2011/0076* (2013.01)

(58) Field of Classification Search
CPC . B64D 11/06; B64D 11/00; B64D 2011/0617; B64D 33/0612; B64D 11/04; A47K 3/38; A47K 3/302; A47K 3/02; B60N 2/34
USPC .................. 244/118.6; 4/609; 296/190.02
See application file for complete search history.

(56) References Cited

U.S. PATENT DOCUMENTS

| | | | | |
|---|---|---|---|---|
| 2,212,326 A | | 8/1940 | Piken | |
| 2,310,573 A | * | 2/1943 | Burton | B64D 11/00 105/315 |
| 2,632,408 A | * | 3/1953 | Giles | B61D 1/04 105/344 |
| 3,102,314 A | * | 9/1963 | Alderfer | A41F 1/002 24/303 |
| 3,382,507 A | * | 5/1968 | Micheau | A47K 3/38 160/349.1 |

(Continued)

FOREIGN PATENT DOCUMENTS

| | | |
|---|---|---|
| DE | 23 53 716 A1 | 4/1975 |
| DE | 24 37 967 A1 | 2/1976 |

(Continued)

OTHER PUBLICATIONS

Netherlands Search Report, Application No. 2011318.

*Primary Examiner* — Brian M O'Hara
*Assistant Examiner* — Assres H Woldemaryam
(74) *Attorney, Agent, or Firm* — NLO N.V.; Catherine A. Shultz; Minerva Rivero

(57) ABSTRACT

An area on board of a vehicle, in particular of an airplane. The area has a compartment and an opening providing access to the compartment. The area includes a curtain arranged to be drawn in a closed position in which the curtain covers the opening. The curtain includes at least one magnetic curtain element provided along a lower edge of the curtain, and the area includes at least one magnetic opening element positioned along a lower edge of the opening, which at least one magnetic opening element and at least one magnetic curtain element are arranged to attract each other when the curtain is in the closed position.

11 Claims, 7 Drawing Sheets

(56) References Cited

U.S. PATENT DOCUMENTS

| | | | | |
|---|---|---|---|---|
| 3,399,713 | A * | 9/1968 | Wilson | A47H 13/14 160/348 |
| 3,898,704 | A * | 8/1975 | Gallaher | A47C 19/205 244/118.6 |
| 4,022,404 | A * | 5/1977 | Greiss | B64D 11/04 186/40 |
| 4,073,331 | A * | 2/1978 | Zilver | A47H 13/16 160/348 |
| 4,589,612 | A * | 5/1986 | Halim | B61D 1/04 105/316 |
| 4,762,361 | A * | 8/1988 | Horton | B60J 5/065 16/277 |
| 5,690,355 | A * | 11/1997 | Kleinberg | B60P 3/38 105/316 |
| 6,019,233 | A * | 2/2000 | Yu | A47H 1/102 211/87.01 |
| 6,367,839 | B1 * | 4/2002 | Langhoff | B60R 22/28 280/751 |
| 7,823,962 | B2 * | 11/2010 | Ekberg | B60P 3/38 296/190.02 |
| 7,934,679 | B2 * | 5/2011 | Bock | B64D 11/00 244/118.6 |
| 8,869,865 | B2 * | 10/2014 | Roach | B64D 11/0023 160/84.04 |
| 9,139,301 | B2 * | 9/2015 | Slyter | B64D 11/0023 |
| 2003/0029576 | A1 * | 2/2003 | Kimmet | E06B 9/0638 160/84.04 |
| 2006/0185072 | A1 * | 8/2006 | Dyckow | A47K 3/38 4/609 |
| 2009/0113617 | A1 * | 5/2009 | Adams | A47K 3/38 4/609 |
| 2011/0114789 | A1 * | 5/2011 | Ergenci | B64D 11/00 244/118.6 |
| 2012/0043028 | A1 | 2/2012 | Roach | |
| 2013/0283519 | A1 * | 10/2013 | Holden | A47H 23/00 4/558 |
| 2014/0246886 | A1 * | 9/2014 | Savard | B64D 11/06 297/62 |
| 2014/0298581 | A1 * | 10/2014 | Chenoweth | A47K 3/38 4/608 |

FOREIGN PATENT DOCUMENTS

| | | |
|---|---|---|
| DE | 42 36 215 A1 | 4/1994 |
| JP | 11225877 * | 8/1999 |
| JP | H11225877 A | 8/1999 |
| NL | 8600577 A | 10/1987 |

* cited by examiner

CREW REST AREA ON BOARD OF A VEHICLE, IN PARTICULAR AN AIRPLANE

CROSS-REFERENCE TO RELATED APPLICATIONS

The instant application claims the priority benefit under 35 U.S.C. §119 of prior Netherlands Patent Application Serial No. 2011318, filed 20 Aug. 2013 by the instant Applicant, having the same title and inventive entity as the instant application. The complete disclosure of this priority application is hereby incorporated herein in its entirety for all purposes by this reference.

BACKGROUND

Field of the Disclosure

The disclosure relates to an area on board of a vehicle, in particular of an airplane, the area providing a compartment, wherein the area comprises an opening providing access to the compartment. More specifically, the disclosure relates to a crew rest area on board of a vehicle, in particular of an airplane, the crew rest area providing a resting place with a bed for a crew member of the airplane, wherein the crew rest area comprises an opening providing access to the crew rest area. The disclosure further relates to an airplane comprising such an area.

Brief Discussion of Related Art

Crew rests areas comprising resting places, are relatively small areas inside an aircraft providing places to rest or sleep for crew members during flight. A crew rest area may comprise one or more resting places. The resting place may also be referred to as a bunk.

SUMMARY

It would be desirable to provide a crew rest area that provides a resting crew member with privacy, while still allowing a crew member to easily leave the crew rest area in case of an emergency.

According to an aspect, there is provided an area on board of a vehicle, in particular of an airplane, the area comprising a compartment, wherein the area comprises an opening providing access to the compartment, characterized in that the area comprises a curtain arranged to be drawn in a closed position in which the curtain covers the opening and in a retracted position, wherein the curtain comprises at least one magnetic curtain element provided along a lower edge of the curtain and the area comprises at least one magnetic opening element positioned along a lower edge of the opening, which at least one magnetic opening element and at least one magnetic curtain element are arranged to attract each other when the curtain is in the closed position.

According to an aspect, there is provided an area as described above, wherein the area is a crew rest area and the compartment is a resting place with a bed for a crew member of the airplane.

According to a further aspect, there is provided a crew rest area on board of a vehicle, in particular of an airplane, the crew rest area comprising a resting place with a bed for a crew member of the airplane, wherein the crew rest area comprises an opening providing access to the resting place, characterized in that the crew rest area comprises a curtain arranged to be drawn in a closed position in which the curtain covers the opening and in a retracted position, wherein the curtain comprises at least one magnetic curtain element provided along a lower edge of the curtain and the crew rest area comprises at least one magnetic opening element positioned along a lower edge of the opening, which at least one magnetic opening element and at least one magnetic curtain element are arranged to attract each other when the curtain is in the closed position.

A crew rest area may comprise one or more resting places. The resting place may also be referred to as a bunk.

In the retracted position the opening is at least partially uncovered.

The curtain may be a single curtain, but may also comprise different curtain portions, for instance two curtain portions which together close the opening (one curtain portion from the left, and one curtain portion from the right).

The term magnetic elements is used to refer to elements that are capable of magnetic interaction. Magnetic elements may for instance be active magnetic elements, that are capable of generating a magnetic field, such as permanent magnetic elements or electromagnets. Magnetic elements may also be passive magnetic elements to which a magnetic force is exerted when positioned in a magnetic field, such as a ferromagnetic materials.

At least one of the interacting magnetic elements are active magnetic elements which are capable of generating a magnetic field.

In order to enable interaction between the magnetic opening elements and the magnetic curtain elements, the magnetic opening elements and the magnetic curtain elements are preferably positioned at substantially the same level (height) and at substantially the same horizontal interspacing with respect to the curtain when in the closed position. The magnetic opening elements are positioned along and below the lower edge of the opening.

The magnetic curtain and opening elements are attracted to each other in the closed position of the curtain, which means that in the closed position, magnetic curtain and openings elements are within each other's magnetic working sphere and the magnets are orientated such that the magnets are attracted to each other.

Hereby, a crew rest area is provided which can be closed in a simple but reliable manner. Privacy for the crew member inside the crew rest area is ensured as the magnetic elements prevent the curtain from unwanted partially and temporally opening, for instance caused by movements of the airplane or caused by other crew members passing or touching the curtain by accident. Also, a curtain is light weighted and provides an effective acoustic isolation.

The crew member can at all times easily leave the crew rest area. Even in case of an emergency, the crew member can simply leave the crew rest area via the opening by simply pushing the curtain away, without the need of operating a lock and/or door handle. This provides a reliable and fail-safe solution of closing the opening of the crew rest area, as even in case of an emergency or sudden evacuation of the airplane, the crew member can at all times leave the crew rest area.

It will be understood that the crew rest area may comprise one or more resting places, each comprising an opening providing access to the resting place.

The use of curtains and the like is known in the field of airplanes (US2012/0043028A1, US2010/0219292A1), but not for use in a crew rest area.

According to an embodiment the crew rest area comprises a plurality of magnetic curtain elements and the magnetic curtain elements are alternately orientated.

The plurality of magnetic curtain element may interact with one or more ferromagnetic opening elements or with a corresponding amount of active magnetic opening elements.

Neighbouring magnetic curtain elements may be positioned oppositely with respect to each other, i.e., with an opposite north-south orientation.

The north-south orientation may be chosen substantially perpendicular to the surface of the curtain. For instance, if one magnetic curtain element is orientated with its north pole away from the resting place and its south pole towards the resting place (when the curtain is in the closed position), its one or two neighbouring magnetic curtain element(s) are orientated with their south poles away from the resting place and its north poles towards the resting place.

Alternatively, the north-south orientation may be chosen in the plane of the curtain, in particular in a direction substantial parallel to a lower edge of the curtain.

This has the advantage that when the curtain is in the retracted position, the magnetic curtain elements can interact with each other, resulting in a nicely fold away curtain, which will not come loose unwanted.

According to an embodiment the curtain comprises a plurality of vertically orientated alternating folds creating a plurality of vertical curtain portions, the folds being provided to facilitate folding the curtain into the retracted position, wherein the magnetic curtain elements are orientated such that in the retracted position adjacent curtain portions are attracted towards each other.

The folds create vertical pleats in the curtain. The term alternating folds is used to indicate that neighboring folds are directed in opposite directions, i.e. the neighboring folds of a fold having its top pointing away from the resting place, have their tops pointing towards the resting place and vice versa.

Each pleat comprises two pleat portions separated by a fold. Each pleat portion may comprise one or more magnetic curtain elements. Alternatively, every second, third or fourth pleat portion may comprise one or more magnetic curtain elements, the pleats in between being without magnetic curtain elements.

According to an embodiment the curtain comprises a plurality of vertical strips which in the retracted position have their surfaces orientated parallel and against each other, wherein the magnetic curtain elements are orientated such that in the retracted position, the strips are attracted towards each other.

Such a curtain may also be referred to as a curtain formed by vertical blinds.

In the retracted position, the strips may be positioned against each other with outside surfaces of the strips being against each other and inside surfaces of the strips being against each other (/\/\/\/\ or zigzag-orientation). Alternatively, in the retracted position, the strips may be positioned against each other with outside surfaces of the strips being against inside surfaces of neighboring strips and vice versa (///////// or fishbone orientation). The orientation of the magnetic curtain elements is chosen to match the orientation of the strips in the retracted position such that the strips are attracted towards each other.

Each strip may comprise one or more magnetic curtain elements. Alternatively, every second, third or fourth strip may comprise one or more magnetic curtain elements, the strips in between being without magnetic curtain elements.

According to an embodiment the vertical strips are connected to each other along their lower edge.

Such a connection ensures that the lower edge of the curtain, now formed by the plurality of strips, are at a predetermined distance from each other in the closed position. This predetermined distance may be relatively small, for instance in the range of 0-2 mm to prevent openings between the strips when in the closed position.

Such a predetermined distance of the strips ensures that the magnetic opening elements are aligned with the magnetic curtain elements in the closed position.

According to an embodiment the vertical strips are connected to each other by a wire.

According to an embodiment the at least one magnetic opening element is orientated to attract the at least one magnetic curtain elements when the curtain is in the closed position.

In particular, when there are a plurality of magnetic curtain elements and a plurality of magnetic opening elements provided, neighbouring magnetic opening elements are positioned oppositely with respect to each other, i.e. with an opposite north-south orientation. The orientation of the magnetic opening elements matches the magnetic curtain elements such that the opening and curtain elements attract each other when the curtain is in the closed position.

According to an embodiment the crew rest area comprises a plurality of magnetic opening elements and the magnetic opening elements are electromagnets and the crew rest area comprises a switch for switching the magnetic opening elements on and off.

This embodiment has the advantages that the curtain can be drawn from the retracted to the closed position and vice versa without magnetic interaction between the curtain and the opening, which makes it easier to position the curtain in the desired position. When the curtain is positioned in the closed position, the user may operate the switch to switch on the electromagnets thereby securing the curtain in the closed position. Before opening the curtain, the user may operate the switch to switch off the electromagnets thereby allowing easy opening of the curtain. In case of an emergency, the curtain may be opened without switching off the electromagnets.

According to a further aspect there is provided an airplane comprising a crew rest area according to any one of the preceding claims.

BRIEF DESCRIPTION OF THE DRAWINGS

Embodiments will now be described, by way of example only, with reference to the accompanying schematic drawings in which corresponding reference symbols indicate corresponding parts, and in which.

Figure 1A:
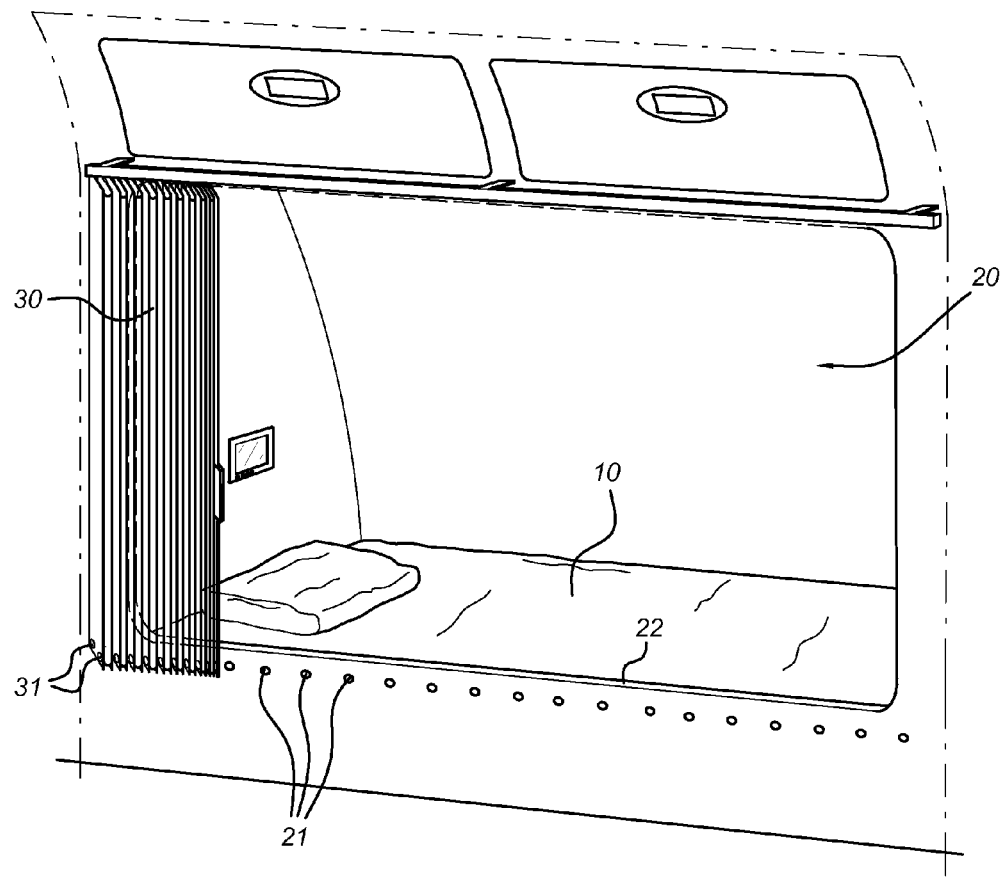
FIGS. 1a-1b schematically shows a crew rest area according to an embodiment.

The figures are meant for illustrative purposes only, and do not serve as restriction of the scope or the protection as laid down by the claims.

DETAILED DESCRIPTION OF THE EMBODIMENTS

The figures schematically show different embodiments of a magnetic curtain 30 for use in a sleeping room or crew rest area 1 inside an aircraft. Such crew rest areas 1 comprise one or more resting places or bunks 10 comprising a bed for a crew member. each bed can be accessed by an opening 20, which can be closed by the curtain 30.

The curtain 30 comprises a hanging portion hanging from a curtain rail and comprises one or more magnetic curtain elements 31 along the lower edge of the curtain 30. The magnetic curtain elements 31 may be formed by one or more ferromagnetic elements or by one or more active magnetic elements.

The magnetic curtain elements 31 are integrated in the hanging portion, for instance inside the fabric forming the curtain 30 or positioned in a hemmed portion of the curtain 30.

Figure 1B:
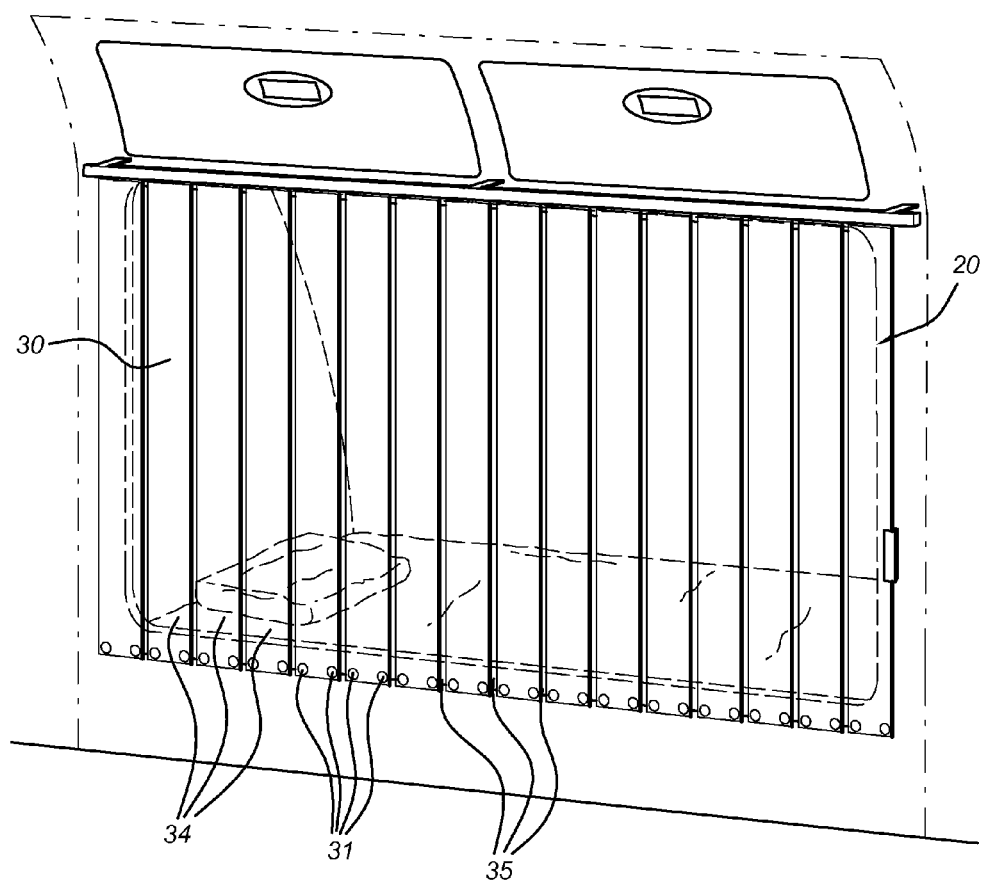
Figure 2A:
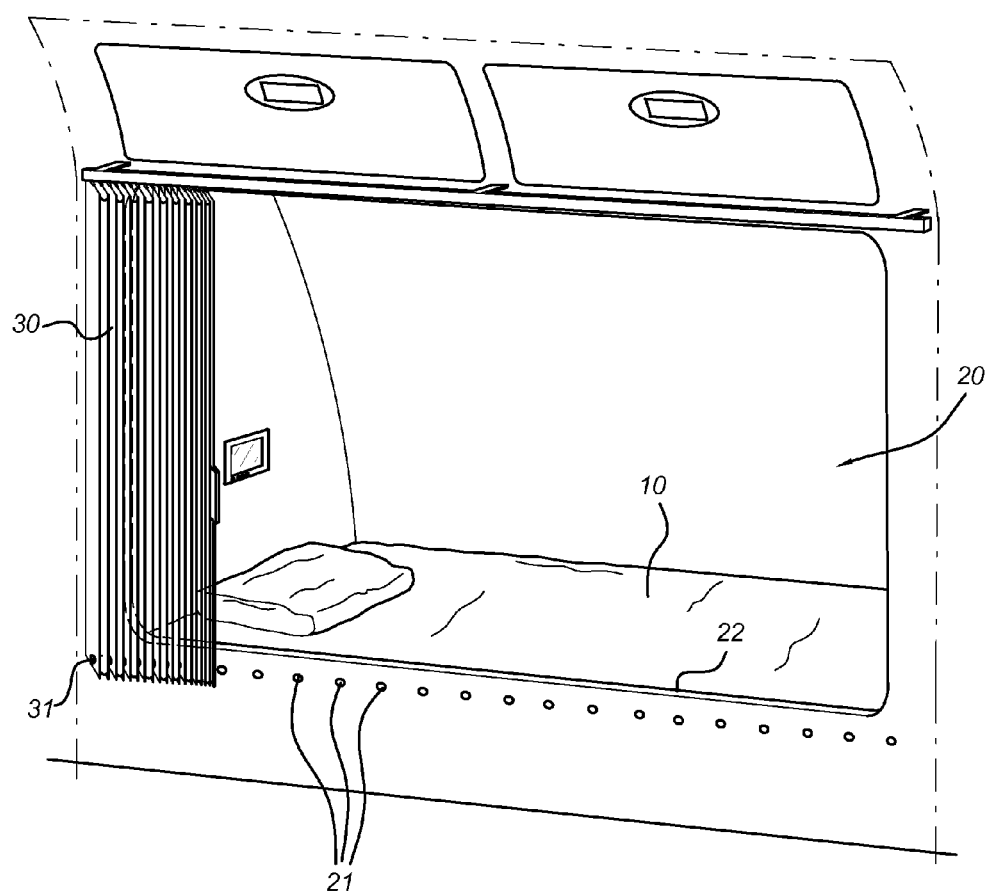
FIGS. 2a-2b schematically shows a crew rest area according to an alternative embodiment, FIGS. 3a-3d schematically show further embodiments, and FIGS. 4a-4f schematically show further embodiments.
Figure 2B:
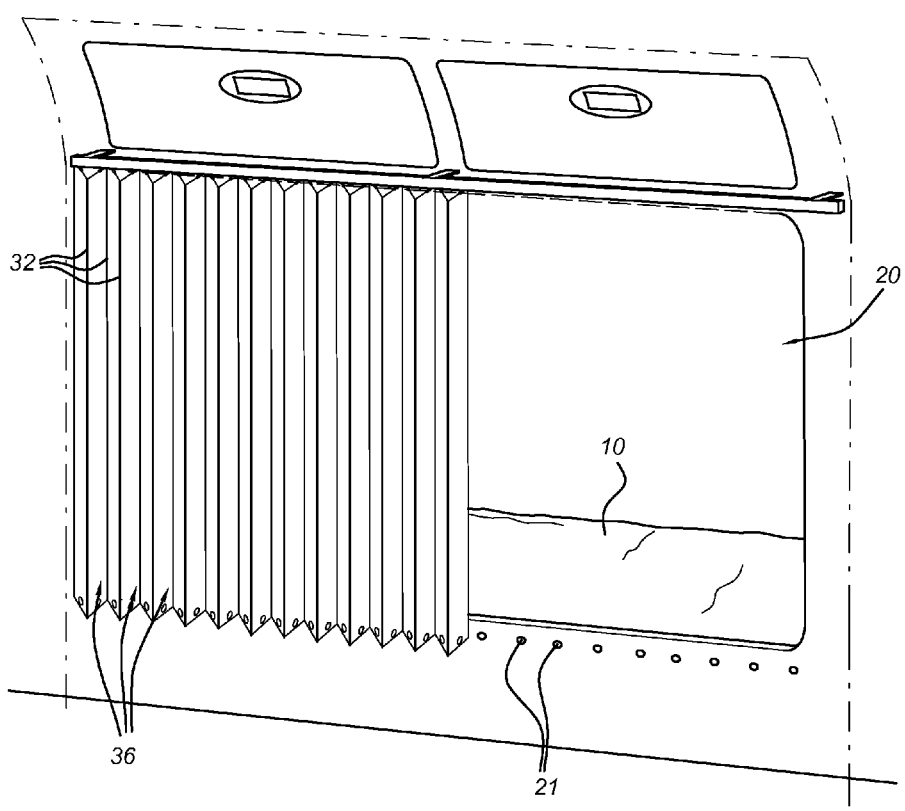

The curtain 30 according to the embodiment shown in FIGS. 1a-1b is formed by a plurality of vertical strips or vertical blinds 34. The curtain 30 according to the embodiment shown in FIGS. 2a-2b is formed by a piece of fabric, which may be pleated to fold away nicely.

For all embodiments in which the magnetic curtain element 31 are active magnetic elements, the magnetic curtain elements 31 may be positioned and orientated such that the magnetic curtain elements 31 are attracted towards each other in the retracted position, to ensure that the curtain folds away neatly. The magnetic curtain elements 31 may for instance be alternately orientated with respect to their nearest neighbouring magnetic curtain elements 31.

When the curtains are closed, the magnetic curtain elements 31 interact and connect to one or more magnetic opening elements 21 provided along a lower edge of the opening 20. The curtain 30 closes the bunk off from light and sound.

It will be understood that many combinations of magnetic elements 31 can be used, which will be further explained with reference to FIGS. 4a-4f.

The embodiment shown in FIGS. 1a-1b shows a curtain comprising a plurality of vertical strips 34 comprising magnetic curtain elements 31 along their lower edges. According to the embodiment shown, each vertical strips 34 comprises two magnetic curtain elements 31, but of course, any other suitable number may be provided instead, including one. The magnetic curtain elements 31 may be active magnets, but may also be passive magnets, such as a ferromagnetic material. In this latter case, the magnetic opening elements 21 are active magnetic elements. The lower parts of the vertical strips 34 may be connected to each other by a wire 35 or the like.

When in the retracted position, the plurality of vertical strips 34 have their surfaces orientated parallel and against each other. Depending on the type of curtain, the vertical strips 34 may be orientated in a zigzag or /\/\/\ orientation or in a fishbone or ////// orientation. The orientation of the magnetic curtain elements 31 may be adapted to this, to ensure that the magnetic curtain elements 31 are attracted by their neighboring magnetic curtain elements 31 in the retracted position.

FIGS. 2a-2b show an alternative embodiment, wherein the curtain 30 is formed by a piece of fabric comprising a plurality of vertical, alternating folds 32 creating a plurality of pleats 36, each pleat comprising two pleat portions. In the retracted position, the curtain 30 will be orientated in a zigzag or /\/\/\ orientation. The position and the orientation of the magnetic curtain elements 31 may be adapted to this, to ensure that the magnetic curtain elements 31 are attracted by their neighboring magnetic curtain elements 31 in the retracted position.

Although the embodiments shown show magnetic curtain elements 31 being present in each pleat portion or vertical strip, it will be understood that this may not necessarily be the case, and that for instance, magnetic curtain elements 31 may be present every 2, 3, 4 . . . etc. pleat portion or vertical strip.

In both embodiments, at least one magnetic opening element 21 may be provided along the lower edge of the opening 20 at a height which matches the height of the at least one magnetic curtain element 31 and at a vertical position and interspacing such that the magnetic curtain and openings elements 31, 21 are in each other working sphere and are attracted towards each other in the closed position of the curtain 30.

In case both the magnetic curtain elements 31 and magnetic opening elements 21 are active, their orientation may be chosen such that they attract each other. In case one of the at least one magnetic curtain elements 31 and magnetic opening elements 21 is a passive magnetic element, the orientation of the other of the at least one magnetic curtain elements 31 and magnetic opening elements 21 can be chosen freely.

According to an embodiment, the magnetic curtain elements 31 or the magnetic opening elements 21 may be provided by electromagnets which can be switched on and off.

FIGS. 3a-3d show examples of different orientations of magnetic curtain elements 31. Although these figures show a curtain formed by a plurality of vertical strips, it will be understood that the examples shown in FIGS. 3a-3c may be applied to a pleated curtain (as described above with reference to FIGS. 2a-2b) as well.

Figure 3A:
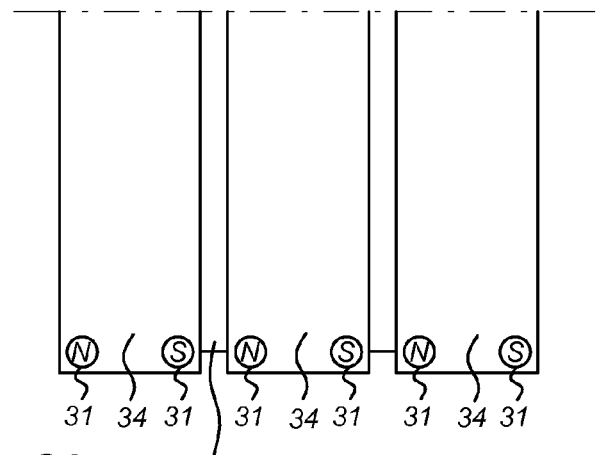

FIG. 3a shows an example wherein the north-south orientation of the magnetic curtain elements 31 is perpendicular to the surface of the curtain. Each vertical strip 34 (or pleat portion) comprises two alternating orientated magnetic curtain elements 31. The orientation of the magnetic curtain elements 31 is similar in each vertical strips 34 (or pleat portions).

Figure 3B:
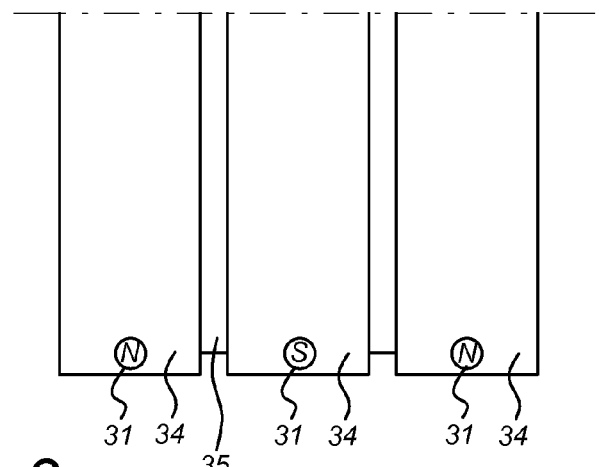

FIG. 3b shows an example wherein the north-south orientation of the magnetic curtain elements 31 is perpendicular to the surface of the curtain. Each vertical strip 34 (or pleat portion) comprises one magnetic curtain elements 31. The orientation of the magnetic curtain elements 31 is opposite in neighbouring vertical strips 34 (or pleat portions).

Figure 3C:
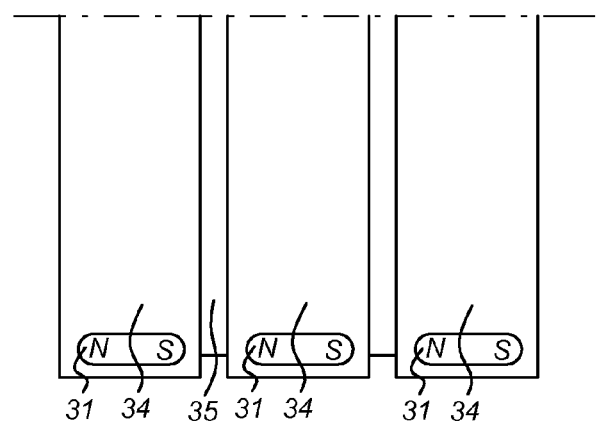

FIG. 3c shows an example wherein the north-south orientation of the magnetic curtain elements 31 is parallel to the lower edge of the curtain 30. Each vertical strip 34 (or pleat portion) comprises one magnetic curtain element 31. The orientation of the magnetic curtain elements 31 is similar in neighbouring vertical strips 34 (or pleat portions).

The embodiments of FIGS. 3a-3c are in particular for curtains which fold away in a zigzag or /\/\/\ orientation.

Figure 3D:
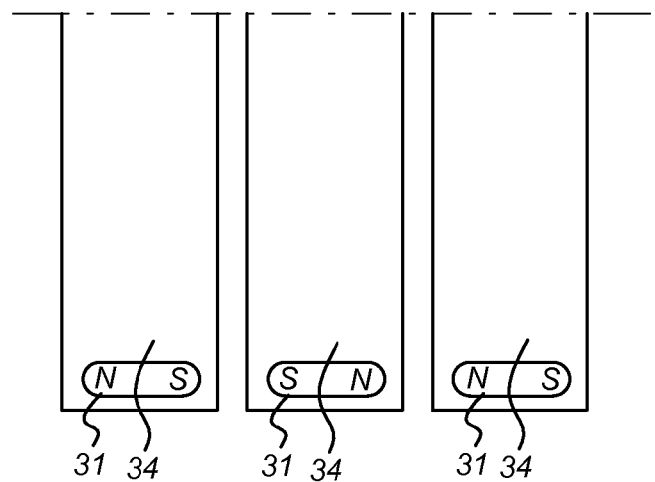

The embodiment shown in FIG. 3d relates in particular to an embodiment wherein the curtain folds away in a fishbone or ////// orientation and thus in particular to a curtain comprising vertical strips 34. FIG. 3d shows an example wherein the north-south orientation of the magnetic curtain elements 31 is parallel to the lower edge of the curtain 30. Each vertical strip 34 (or pleat portion) comprises one magnetic curtain element 31. The orientation of the magnetic curtain elements 31 is opposite in neighbouring vertical strips 34.

It will be understood that many variations can be conceived and that the examples of FIGS. 3a-3d are just provided by way of example.

FIGS. 4a-4f show different examples of combinations of magnetic curtain elements 31 and magnetic opening elements 21. These figures show a cross sectional top view of part of the curtain 30 next to the magnetic opening elements 21. Although these figures show a pleated curtain (as described above with reference to FIGS. 1a-1b), it will be understood that the examples shown in FIGS. 4a-4f may be applied to a curtain formed by a plurality of vertical strips (as described above with reference to FIGS. 1a-1b) as well.

Figure 4A:
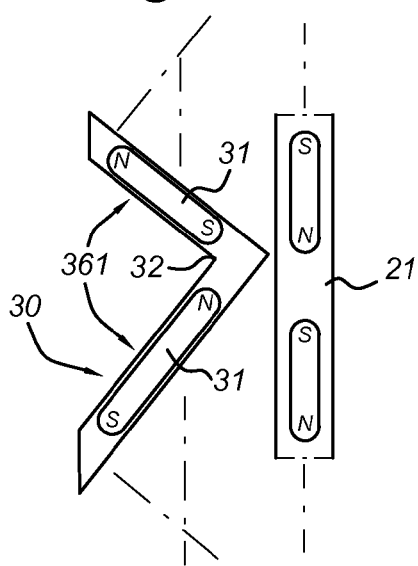

FIG. 4a shows a single pleat with two pleat portions 361 formed by a fold 32 of the curtain 30, wherein each pleat portion comprises a magnetic curtain element 31 with its north-south orientation parallel to the surface of the curtain 30. The orientation of neighboring magnetic curtain elements 31 are similar. The magnetic opening elements 21 are orientated with their north-south orientation parallel to the lower edge of the opening 20 and are positioned such that their north and south poles match the position of the south and north poles of the magnetic curtain elements 31 when the curtain is in the closed position.

Figure 4B:
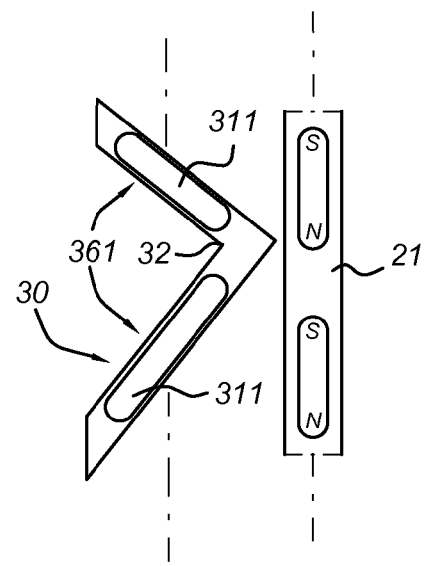
Figure 4C:
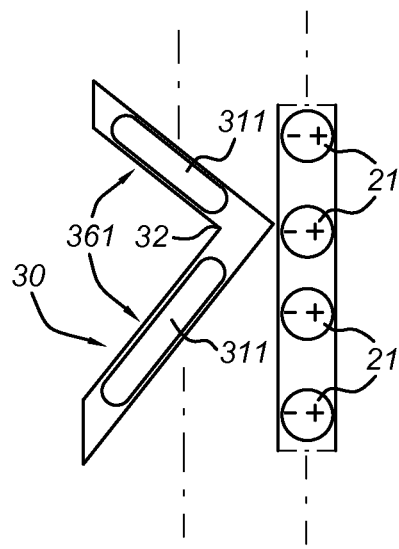

FIGS. 4b and 4c shows a single pleat with two pleat portions 361 formed by a fold 32 of the curtain 30, wherein the magnetic curtain elements 31 are formed by one or more passive magnetic elements 311, such as ferromagnetic elements. The magnetic opening elements 21 are active magnetic elements, such as permanent magnets, with their north-south orientation parallel to the lower edge of the opening 20 (FIG. 4b) or with their north-south orientation perpendicular in a direction perpendicular to the lower edge of the opening 20 and directed towards the curtain 30 (FIG. 4c).

Figure 4D:
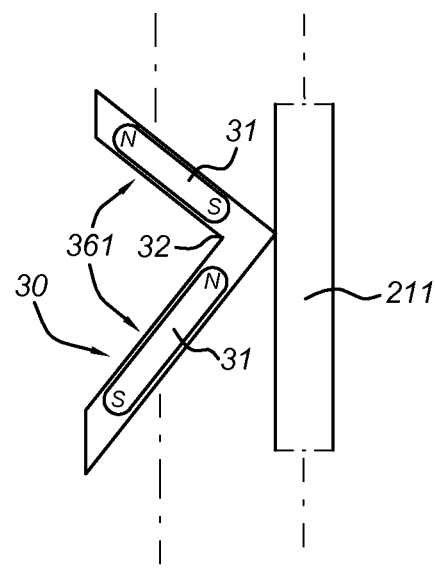

FIG. 4d shows a single pleat with two pleat portions 361 formed by a fold 32 of the curtain 30, wherein each pleat portion comprises a magnetic curtain element 31 formed by permanent magnets, with their north-south orientation in any desired direction, for instance parallel to the surface of the curtain 30 (as shown). The magnetic opening elements 21 are formed by a passive magnetic opening elements 211 (such as ferromagnetic elements as shown in FIG. 4d) or formed by electromagnetic elements (not shown).

Figure 4E:
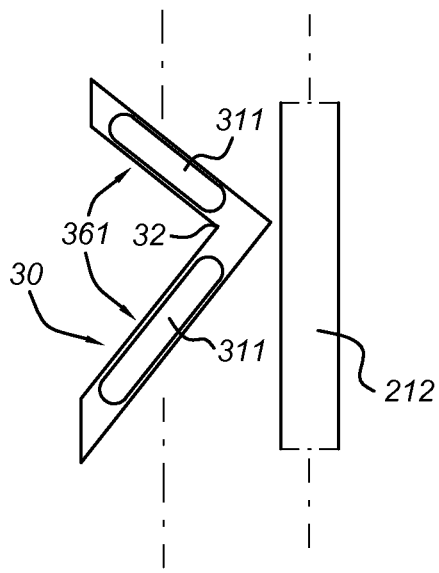

FIG. 4e shows a single pleat with two pleat portions 361 formed by a fold 32 of the curtain 30, wherein the magnetic curtain elements 31 are formed by passive magnets 311, such as ferromagnetic elements and the magnetic curtain elements 21 are formed by one or more electromagnets 212.

Figure 4F:
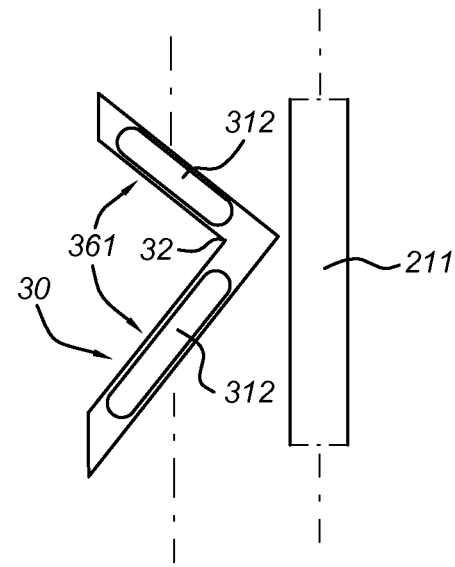

FIG. 4f shows a single pleat with two pleat portions 361 formed by a fold 32 of the curtain 30, wherein the magnetic curtain elements 31 are formed by electromagnets 312 and the magnetic curtain elements 21 are formed by passive magnetic elements 211.

The skilled in the art will appreciate that the present disclosure is not limited to crew rest areas in airplanes as described above, but also may relate to an access or passage area on board of a vehicle in particular of an airplane in which the access or passage area comprises an opening that provides an access or passage to a neighboring space in the vehicle wherein the access or passage area comprises a curtain arranged to be drawn in a closed position in which the curtain covers the opening and in a retracted position that leaves the opening at least partially uncovered, wherein the curtain comprises at least one magnetic curtain element provided along a lower edge of the curtain and the access or passage area comprises at least one magnetic opening element positioned along a lower edge of the opening, which at least one magnetic opening element and at least one magnetic curtain element are arranged to attract each other when the curtain is in the closed position.

The access or passage area may be a closeable separation of a compartment in the vehicle, in which the curtain is arranged in a closed position to cover the access or passage to said compartment.

The separation may be used as described above to cover a crew rest area but may also be used in relation to a passenger compartment, or a galley compartment.

The descriptions above are intended to be illustrative, not limiting. It will be apparent to the person skilled in the art that alternative and equivalent embodiments of the disclosure can be conceived and reduced to practice, without departing from the scope of the claims set out below.

What is claimed is:

1. A crew rest area on board of a vehicle, the area comprising:
    a compartment having an opening providing access to the compartment, the opening having a lower edge, and the compartment having a plurality of magnetic opening elements positioned along the lower edge of the opening; and
    a curtain configured to be drawn to a closed position, in which the curtain covers the opening, the curtain further configured to be drawn to a retracted position, the curtain having a lower edge, the curtain comprising a plurality of magnetic curtain elements provided along the lower edge of the curtain, and the curtain comprising a plurality of vertically oriented alternating folds creating a plurality of vertical curtain portions wherein each of the plurality of vertical curtain portions comprises one or more of said plurality of magnetic curtain elements,
    in the closed position, the plurality of magnetic opening elements and plurality of magnetic curtain elements are arranged to attract each other, and
    in the retracted position, the plurality of magnetic curtain elements are arranged so that polarities are alternately oriented from the one or more magnetic curtain elements in one of said plurality of vertical curtain portions to a neighboring one or more magnetic curtain elements in a neighboring vertical curtain portion.

2. The crew rest area according to claim 1, wherein the compartment is a resting place with a bed for a crew member of the vehicle.

3. The crew rest area according to claim 1, wherein the curtain comprises a plurality of vertical strips which in the retracted position have their surfaces orientated parallel and against each other, wherein in the retracted position, the vertical strips are attracted towards each other.

4. The crew rest area according to claim 3, wherein the vertical strips are connected to each other along their lower edge.

5. The crew rest area according to claim 4, wherein the vertical strips are connected to each other by a wire.

6. The crew rest area according to claim 1, wherein the plurality of magnetic opening elements are electromagnets and the area comprises a switch for switching the magnetic opening elements on and off.

7. The crew rest area according to claim 1, wherein the compartment is a passenger compartment or a galley compartment.

8. An airplane comprising a crew rest area according to claim 1.

9. The crew rest area according to claim 1, wherein the folds facilitate folding the curtain into the retracted position, and wherein in the retracted position adjacent, curtain portions are attracted towards each other.

10. The crew rest area according to claim 1, wherein the curtain comprises a plurality of vertical strips, which plurality of vertical strips in the retracted position have surfaces orientated parallel and against each other, wherein the plurality of magnetic curtain elements are arranged on the plurality of vertical strips such that in the retracted position, the vertical strips are attracted towards each other.

11. The crew rest area according to claim 1, wherein the magnetic curtain elements are arranged to attract each other when the curtain is in the open position, such that the magnetic curtain elements are engaged in effecting a closed position as well as a retracting position.

\* \* \* \* \*